United States Patent
Tu et al.

(10) Patent No.: US 9,716,404 B2
(45) Date of Patent: Jul. 25, 2017

(54) CHARGING CIRCUIT AND CHARGING METHOD OF BATTERY

(71) Applicant: ASUSTeK COMPUTER INC., Taipei (TW)

(72) Inventors: Wei-Chen Tu, Taipei (TW); Ming-Ting Tsai, Taipei (TW); Yii-Lin Wu, Taipei (TW); Hsiang-Jue Hung, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 151 days.

(21) Appl. No.: 14/576,185

(22) Filed: Dec. 18, 2014

(65) Prior Publication Data

US 2015/0180261 A1    Jun. 25, 2015

(30) Foreign Application Priority Data

Dec. 24, 2013 (CN) .......................... 2013 1 0719865

(51) Int. Cl.
*H02J 7/04*  (2006.01)
(52) U.S. Cl.
CPC .............. *H02J 7/045* (2013.01); *H02J 7/041* (2013.01); *Y02B 40/90* (2013.01)
(58) Field of Classification Search
CPC ...................................................... H02J 7/007
See application file for complete search history.

(56) References Cited

U.S. PATENT DOCUMENTS

| | | | |
|---|---|---|---|
| 5,541,490 A * | 7/1996 | Sengupta | G01R 31/3624 320/160 |
| 5,861,730 A | 1/1999 | Lee | |
| 6,255,804 B1 * | 7/2001 | Herniter | H02J 7/35 320/137 |
| 8,421,416 B2 * | 4/2013 | Hsu | H02J 7/0072 320/132 |
| 2003/0067283 A1 * | 4/2003 | Takimoto | H02J 7/041 320/162 |
| 2009/0261786 A1 | 10/2009 | Hsu et al. | |
| 2010/0308654 A1 * | 12/2010 | Chen | H02M 3/1584 307/31 |

(Continued)

FOREIGN PATENT DOCUMENTS

| | | |
|---|---|---|
| CN | 1179640 A | 4/1998 |
| CN | 1361570 A | 7/2002 |
| JP | 09-130987 A | 5/1997 |

OTHER PUBLICATIONS

US20090261786A1—pertinent parts.

*Primary Examiner* — Drew A Dunn
*Assistant Examiner* — Tynese McDaniel
(74) *Attorney, Agent, or Firm* — CKC & Partners Co., Ltd.

(57) ABSTRACT

A charging circuit and a charging method of a battery are disclosed. The charging circuit provides a charging current to charge the battery. The charging circuit includes a charging control module, a current detecting module and a compensation module. The charging control module provides a charging voltage. The current detecting module detects the charging current, and generates a detecting voltage according to the charging current. The compensation module detects the charging voltage, and provides a feedback voltage to the charging control module according to the detecting voltage and the charging voltage.

4 Claims, 5 Drawing Sheets

(56) References Cited

U.S. PATENT DOCUMENTS

| | | | |
|---|---|---|---|
| 2011/0193531 A1* | 8/2011 | Sheng | H02J 7/0083 320/148 |
| 2011/0199059 A1* | 8/2011 | Aradachi | H02J 7/0031 320/162 |
| 2011/0227525 A1* | 9/2011 | Blackall | H02J 7/0086 320/107 |
| 2011/0227542 A1* | 9/2011 | Akaho | H02J 7/045 320/145 |
| 2012/0217936 A1* | 8/2012 | Kung | H02J 7/0077 320/163 |
| 2014/0125131 A1* | 5/2014 | Lalitnuntikul | G06F 1/266 307/31 |
| 2014/0167681 A1* | 6/2014 | Tu | H02J 7/045 320/107 |

* cited by examiner

CHARGING CIRCUIT AND CHARGING METHOD OF BATTERY

CROSS-REFERENCE TO RELATED APPLICATION

This application claims the priority benefit of CN application serial No. 201310719865.9, filed on Dec. 24, 2013. The entirety of the above-mentioned patent application is hereby incorporated by reference herein and made a part of specification.

BACKGROUND OF THE INVENTION

Field of the Invention

The disclosure relates to a charging circuit and a charging method of a battery.

Description of the Related Art

As science technology develops rapidly, a rechargeable battery, such as a lithium battery and a nickel battery, is commonly used in people's life.

Generally, the charging process of a lithium battery includes four stages, which are trickle charge stage, pre-charge stage, constant current stage and constant voltage stage. In the constant voltage stage, the charging current continuously decreases, which causes low charging efficiency and increases the charging time of a battery.

BRIEF SUMMARY OF THE INVENTION

A charging circuit of a battery is provided. The charging circuit of the battery provides a charging current to charge the battery. The charging circuit includes a charging control module, a current detecting module and a compensation module. The charging control module provides a charging voltage. The current detecting module detects the charging current and generates a detecting voltage according to the charging current. The compensation module detects the charging voltage and provides a feedback voltage to the charging control module according to the detecting voltage and the charging voltage.

A charging method of a battery is also provided. The charging method provides a charging current via a charging path to charge the battery. The charging method includes following steps: providing a charging voltage to the charging path by a charging control module; detecting the charging current of the charging path; generating a detecting voltage according to the charging current; and providing a feedback voltage to the charging control module according to the detecting voltage and the charging voltage.

As stated above, the compensation module can provide the feedback voltage to the charging control module according to the detecting voltage which corresponds to the charging current, and thus the charging control module can obtain the battery voltage. Consequently, the charging circuit can effectively shorten the charging time of the battery to increase the charging efficiency.

These and other features, aspects and advantages of the present disclosure will become better understood with regard to the following description, appended claims, and accompanying drawings.

DETAILED DESCRIPTION OF THE EMBODIMENTS

A charging circuit and a charging method of a battery are illustrated with relating figures as follows, and persons having ordinary skill in the art may make various modifications and changes without departing from the scope.

Figure 1:
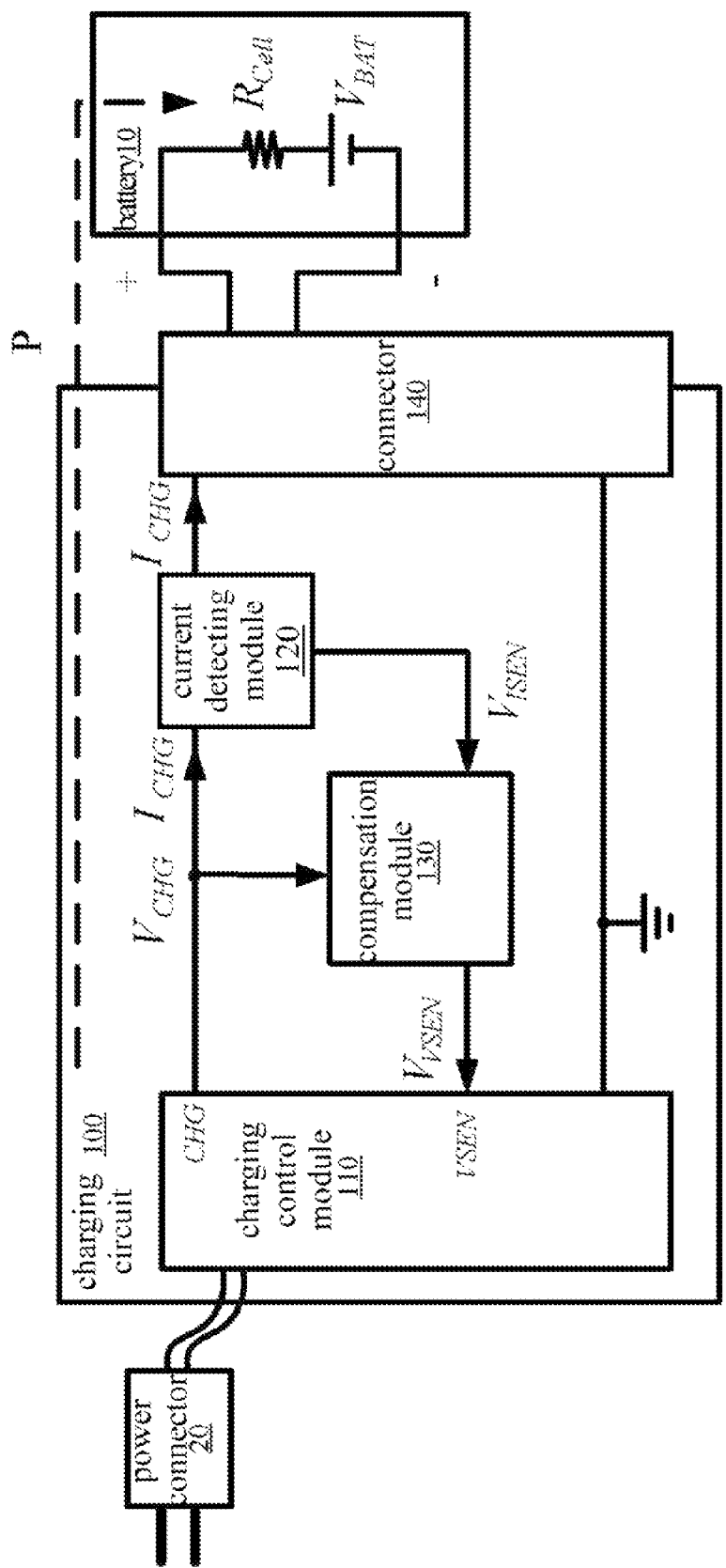
FIG. 1 is a schematic diagram showing a charging circuit in a first embodiment.

FIG. 1 is a schematic diagram showing a charging circuit 100 in a first embodiment. The charging circuit 100 is electrically connected to a power connector 20 and a battery 10. The charging circuit 100 receives power from the power connector 20 and provides a charging current $I_{CHG}$ to charge the battery 10 via a charging path P.

In the embodiment, the charging circuit 100 includes a charging control module 110, a current detecting module 120, a compensation module 130 and a connector 140. The charging control module 110 is electrically connected to the current detecting module 120 and the compensation module 130. The current detecting module 120 is electrically connected to the compensation module 130 and the connector 140. The connector 140 is electrically connected to the battery 10. The charging control module 110 may be achieved via a charging integrated circuit (IC). The current detecting module 120 and the compensation module 130 may be achieved via circuits.

The charging control module 110 provides a charging voltage $V_{CHG}$ and a charging current $I_{CHG}$ to the battery 10, and determines whether the battery voltage $V_{BAT}$ reaches a predetermined saturated charging level of the battery 10 according to the charging voltage $V_{CHG}$ to determine whether to switch a charging mode. However, since a resistance exists at the charging path P and a voltage differential exists between the charging voltage $V_{CHG}$ and the battery voltage $V_{BAT}$, the charging control module 110 cannot accurately determine whether to switch the charging mode.

Figure 2:
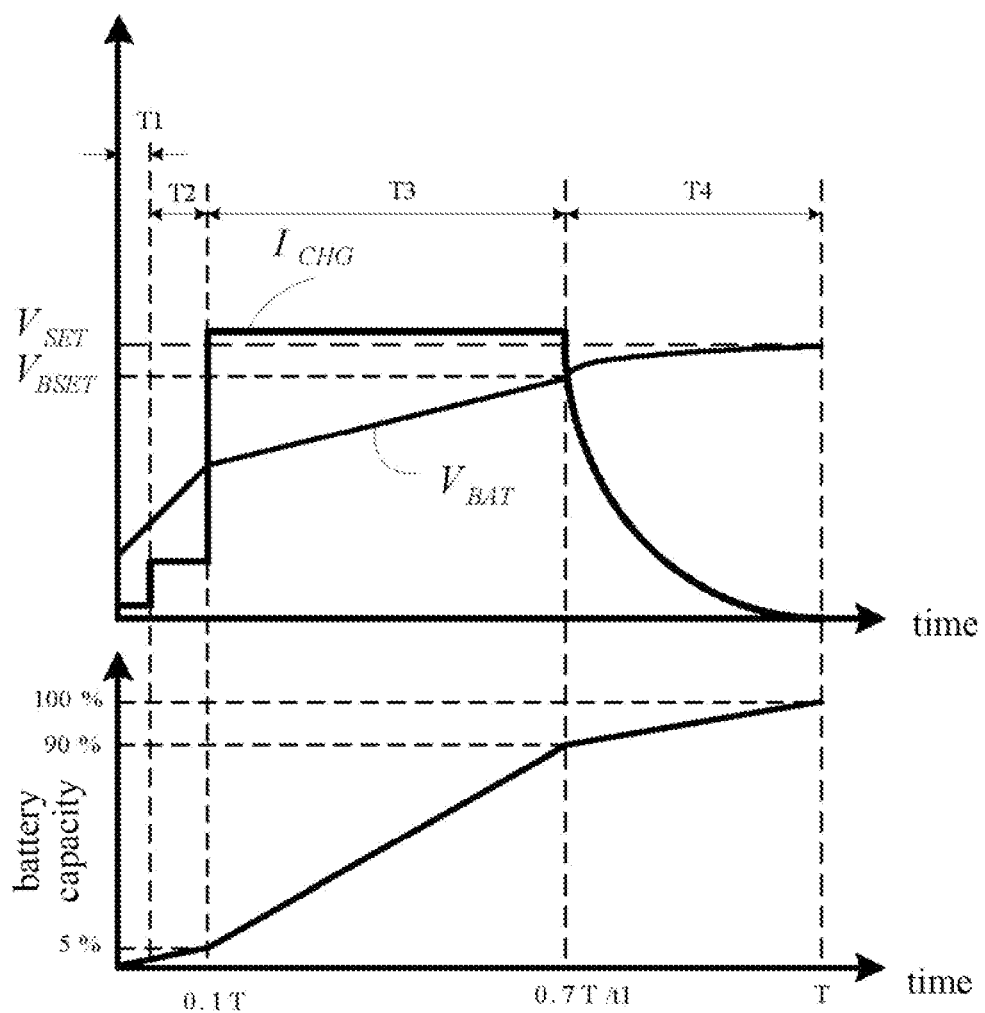
FIG. 2 is a schematic diagram showing a charging process of a battery in a comparing embodiment.

For example, please refer to FIG. 2, during the period T1 to T3, the charging control module 110 provides the charging current $I_{CHG}$ of different amperage to the battery 10, respectively. At the time point t1, the charging voltage $V_{CHG}$ provided by the charging control module 110 reaches the predetermined saturated charging level $V_{SET}$ of the battery 10, and the charging control module 110 switches the charging mode to a constant voltage mode. At the moment, the capacity of the battery 10 is charged to 90%, and the battery voltage $V_{BAT}$ has a voltage level $V_{BSET}$. Then, during the period T4, since the charging current $I_{CHG}$ continuously decreases, although only 10% of the battery capacity is charged, 30% of the whole cycle T is consumed.

Consequently, in the embodiment, in order to improve the charging efficiency of the charging circuit 100, the charging circuit 100 can compensate the voltage differential between the charging voltage $V_{CHG}$ and the battery voltage $V_{BAT}$ via the current detecting module 120 and the compensation module 130.

In detail, in the embodiment, the current detecting module 120 detects the charging current $I_{CHG}$, generates a detecting voltage $V_{ISEN}$ according to the charging current $I_{CHG}$, and provides the detecting voltage $V_{ISEN}$ to the compensation module 130. The compensation module 130 detects the charging voltage $V_{CHG}$, and provides the feedback voltage $V_{VSEN}$ to the charging control module 110 according to the detecting voltage $V_{ISEN}$ and the charging voltage $V_{CHG}$.

As stated above, the current detecting module 120 and the compensation module 130 can simulate the resistance at the charging path P to make the value of the feedback voltage $V_{VSEN}$ roughly equal to the value of the battery voltage $V_{BAT}$. Thus, the charging control module 110 can accurately switch the charging mode when the battery voltage $V_{BAT}$ reaches the predetermined saturated charging level.

For example, in the embodiment, the charging control module 110 can determine whether the feedback voltage $V_{VSEN}$ is larger than or equals to the predetermined saturated charging level. When the feedback voltage $V_{VSEN}$ is larger than or equals to the predetermined saturated charging level, the charging control module 110 is switched from providing a constant charging current $I_{CHG}$ to providing a fluctuant charging current $I_{CHG}$ to the battery 10.

Figure 3:
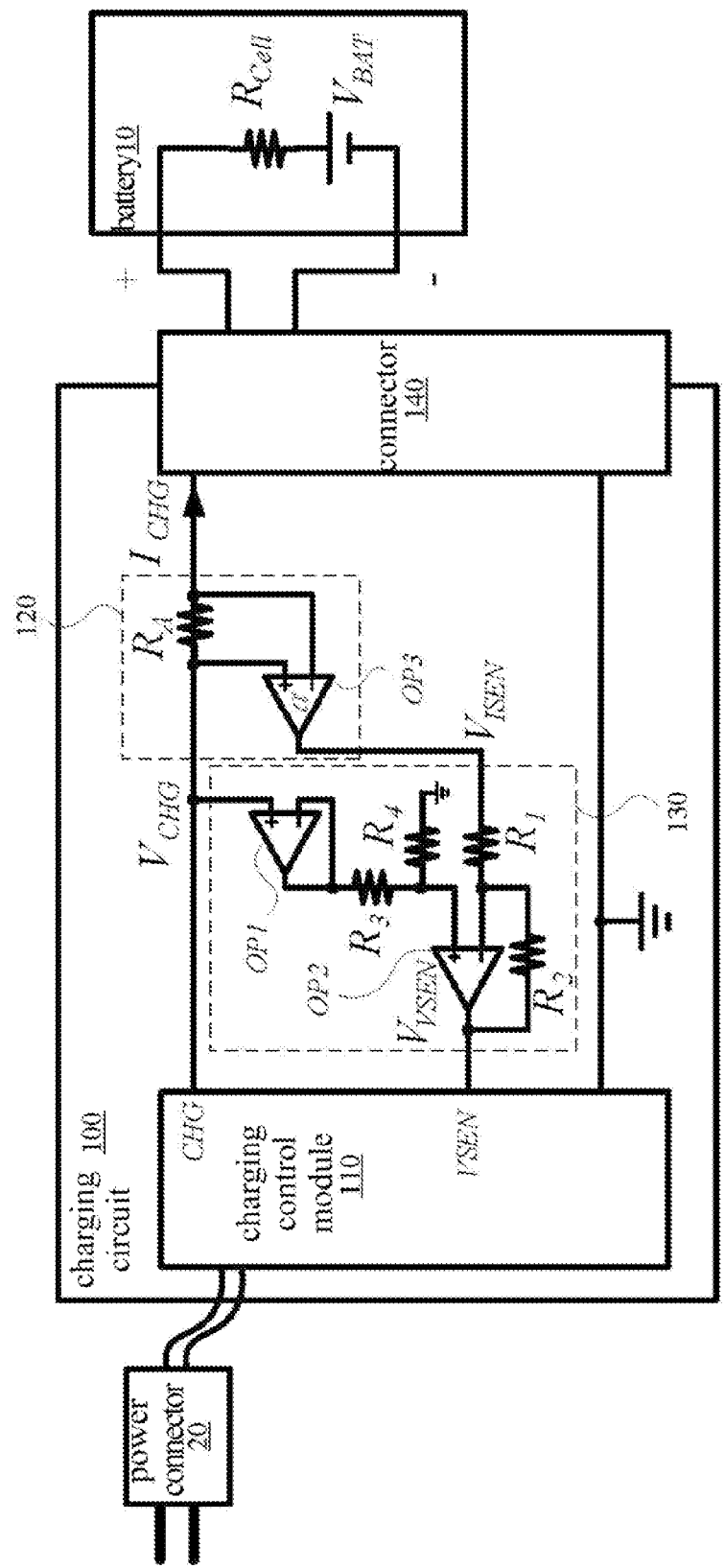
FIG. 3 is a schematic diagram showing details of the charging circuit in the first embodiment.

FIG. 3 is a schematic diagram showing details of the charging circuit 100 in the first embodiment.

In the embodiment, the current detecting module 120 includes a current detecting resistor $R_4$ and a differential amplifier OP3. The current detecting resistor $R_4$ is connected between an output node CHG of the charging control module 110 and the connector 140. Two input terminals of the differential amplifier OP3 are electrically connected to two ends of the current detecting resistor $R_4$, respectively, and an output terminal of the differential amplifier OP3 is electrically connected to the compensation module 130.

When the charging current $I_{CHG}$ flows through the current detecting resistor $R_4$, a potential difference corresponding to the charging current $I_{CHG}$ is generated between the two ends of the current detecting resistor $R_4$. The differential amplifier OP3 can amplify the potential difference by $\alpha$ times (if $\alpha$ is larger than 1) to provide the detecting voltage $V_{ISEN}$ to the compensation module 130 according to the charging current $I_{CHG}$.

In the embodiment, the detecting voltage $V_{ISEN}$ can be calculated as follows:

$$V_{ISEN} = I_{CHG} \times R_4 \times \alpha \qquad \text{Formula (1)}$$

Furthermore, the compensation module 130 includes resistors $R_1$ to $R_4$, a buffer OP1 and an operational amplifier OP2. A non-inverting input terminal of the buffer OP1 is electrically connected to an output node CHG of the charging control module 110 to receive the charging voltage $V_{CHG}$. An inverting input terminal of the buffer OP1 is electrically connected to the output terminal of the buffer OP1. The resistor $R_1$ is electrically connected between the inverting input terminal of the operational amplifier OP2 and the output terminal of the differential amplifier OP3. The resistor $R_2$ is electrically connected between the inverting input terminal of the operational amplifier OP2 and the output terminal of the operational amplifier OP2. The resistor $R_3$ is electrically connected between the output terminal of the buffer OP1 and the non-inverting input terminal of the operational amplifier OP2. The resistor $R_4$ is electrically connected between the non-inverting input terminal of the operational amplifier OP2 and a ground potential. The output terminal of the operational amplifier OP2 is electrically connected to an input node $V_{SEN}$ of the charging control module 110.

As stated above, the buffer OP1 can buffer the charging voltage $V_{CHG}$, and provides the buffered charging voltage $V_{CHG}$ to the non-inverting input terminal of the operational amplifier OP2. On the other hand, the operational amplifier OP2 can receive the detecting voltage $V_{ISEN}$ via the resistor $R_1$, receive the buffered charging voltage $V_{CHG}$ via the resistor $R_3$, and subtract the detecting voltage $V_{ISEN}$ from the charging voltage $V_{CHG}$ to calculate the feedback voltage $V_{VSEN}$ which is provided to the charging control module 110.

In the embodiment, if the resistance value of the resistor $R_1$ is the same as that of the resistor $R_4$, and the resistance value of the resistor $R_2$ is the same as that of the resistor $R_3$, the feedback voltage $V_{VSEN}$ can be represented as follows:

$$V_{VSEN} = V_{CHG} - (R_2/R_1) \times V_{ISEN} \qquad \text{Formula (2)}$$

A formula (3) can be obtained according to the formula (1) and the formula (2) as follows.

$$V_{VSEN} = V_{CHG} - \alpha \times (R_2/R_1) \times R_4 \times I_{CHG} \qquad \text{Formula (3)}$$

Thus, the value of $\alpha \times (R_2/R_1) \times R_4$ can be made roughly equivalent to the impedance at the charging path P, and the feedback voltage $V_{VSEN}$ roughly equals to the battery voltage $V_{BAT}$ (which is the charging voltage $V_{CHG}$ minus a potential drop at the charging path P).

Consequently, the charging control module 110 can evaluate the battery voltage $V_{BAT}$ of the battery 10 more accurately, and switch the charging mode when the battery voltage $V_{BAT}$ reaches the predetermined saturated charging level.

In other embodiments, the compensation module 130 may also be achieved via a micro control chip or other programmable digital chips, which is not limited herein.

Figure 4:
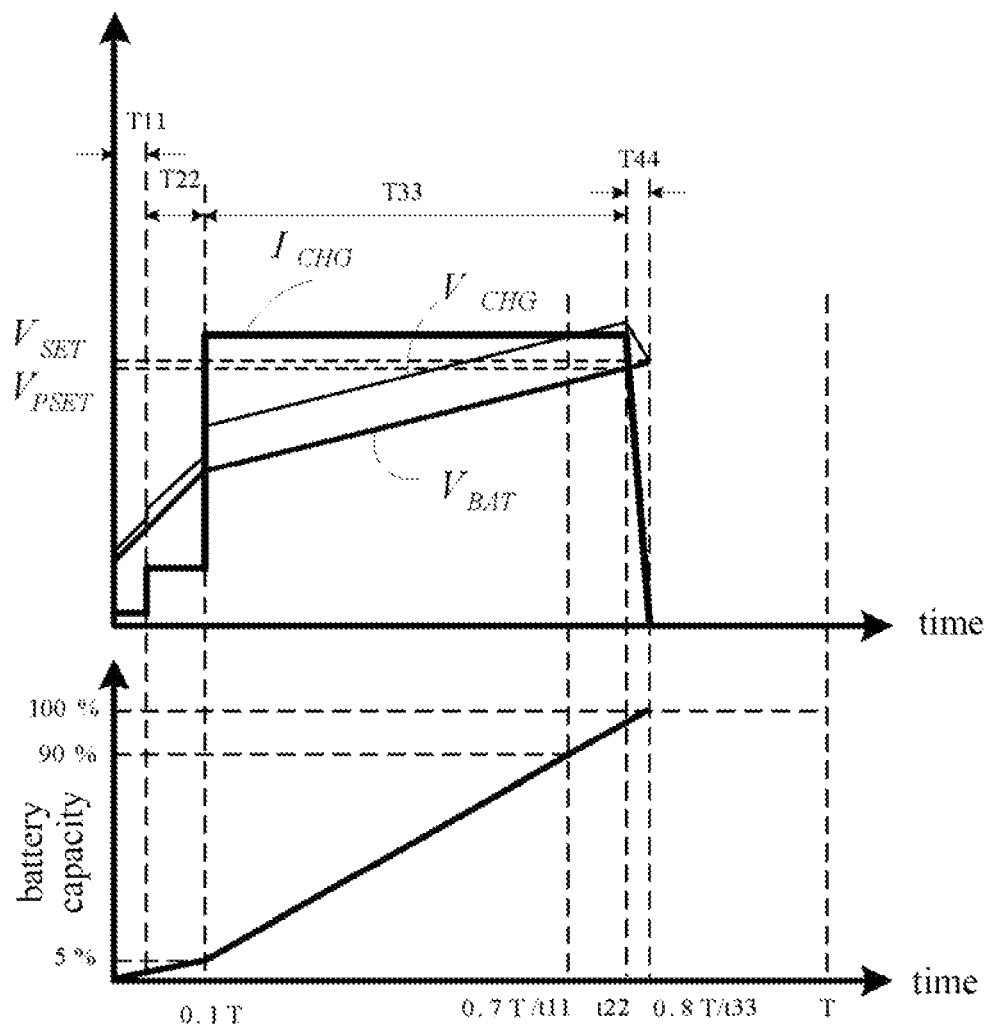
FIG. 4 is a schematic diagram showing a charging process of a battery in an embodiment.

FIG. 4 is a schematic diagram showing a charging process of the charging circuit 100 in an embodiment.

Please refer to FIG. 4, during the period T11 to T33, the charging circuit 100 provides the charging current $I_{CHG}$ of first constant amperage, second constant amperage and third constant amperage to the battery 10, respectively. The third constant amperage is larger than the second constant amperage, and the second constant amperage is larger than the first constant amperage. During the period T11 to T33, the battery voltage $V_{BAT}$ of the battery 10 is raised as the charging time increases, and the charging voltage $V_{CHG}$ of the charging circuit 100 is raised as the battery voltage $V_{BAT}$ increases.

At the time point t11, although the capacity of the battery 10 is charged to 90%, the feedback voltage $V_{VSEN}$ does not reach the saturated charging level $V_{SET}$. Thus, the charging circuit 100 does not switch the charging mode and still provides a constant charging current $I_{CHG}$. Then, at the time point t22, the feedback voltage $V_{VSEN}$ reaches the saturated charging level $V_{SET}$, and the charging circuit 100 switches the charging mode. At the moment, the battery voltage $V_{BAT}$ has a level $V_{PSET}$.

Then, during the period T44, the battery voltage $V_{BAT}$ continuously increases, and the charging voltage $V_{CHG}$ decreases as the charging current $I_{CHG}$ decreases. The charging current $I_{CHG}$ decreases as the difference between the charging voltage $V_{CHG}$ and the battery voltage $V_{BAT}$ becomes smaller. At the time point t33, the charging current $I_{CHG}$ decreases to 0, and the voltage levels of the charging voltage $V_{CHG}$ and the battery voltage $V_{BAT}$ are the same (referred to the formula (3)). At the moment, the battery voltage $V_{BAT}$ has a saturated charging level $V_{SET}$.

Compared with the embodiment shown in FIG. 2, the time point of switching the charging mode by the charging circuit 100 in the embodiment is later, the capacity of the battery 10 is larger when the charging mode is switched, and thus the ratio of the period T44 to the whole cycle T is smaller. As shown in FIG. 4, the charging time of the battery 10 is shortened by 20% compared with that in FIG. 2.

On the other hand, the voltage level of the feedback voltage $V_{VSEN}$ is the same as that of the battery voltage $V_{BAT}$ under an ideal condition. Thus, when the feedback voltage $V_{VSEN}$ reaches the saturated charging level $V_{SET}$ (at the time point t22), the battery voltage $V_{BAT}$ should also reach the saturated charging level $V_{SET}$. However, practically, since an inner impedance $R_{cell}$ of the battery 10 is not easy to be evaluated, the voltage level of the feedback voltage $V_{VSEN}$ may be slightly higher than that of the battery voltage $V_{BAT}$. Consequently, when the feedback voltage $V_{VSEN}$ reaches the saturated charging level $V_{SET}$, the battery voltage $V_{BAT}$ has a voltage level $V_{PSET}$. The charging circuit 100 can switch the charging mode at the moment and charge the battery voltage $V_{BAT}$ to the saturated charging level $V_{SET}$ via the fluctuant charging current $I_{CHG}$ during the period T44.

Figure 5:
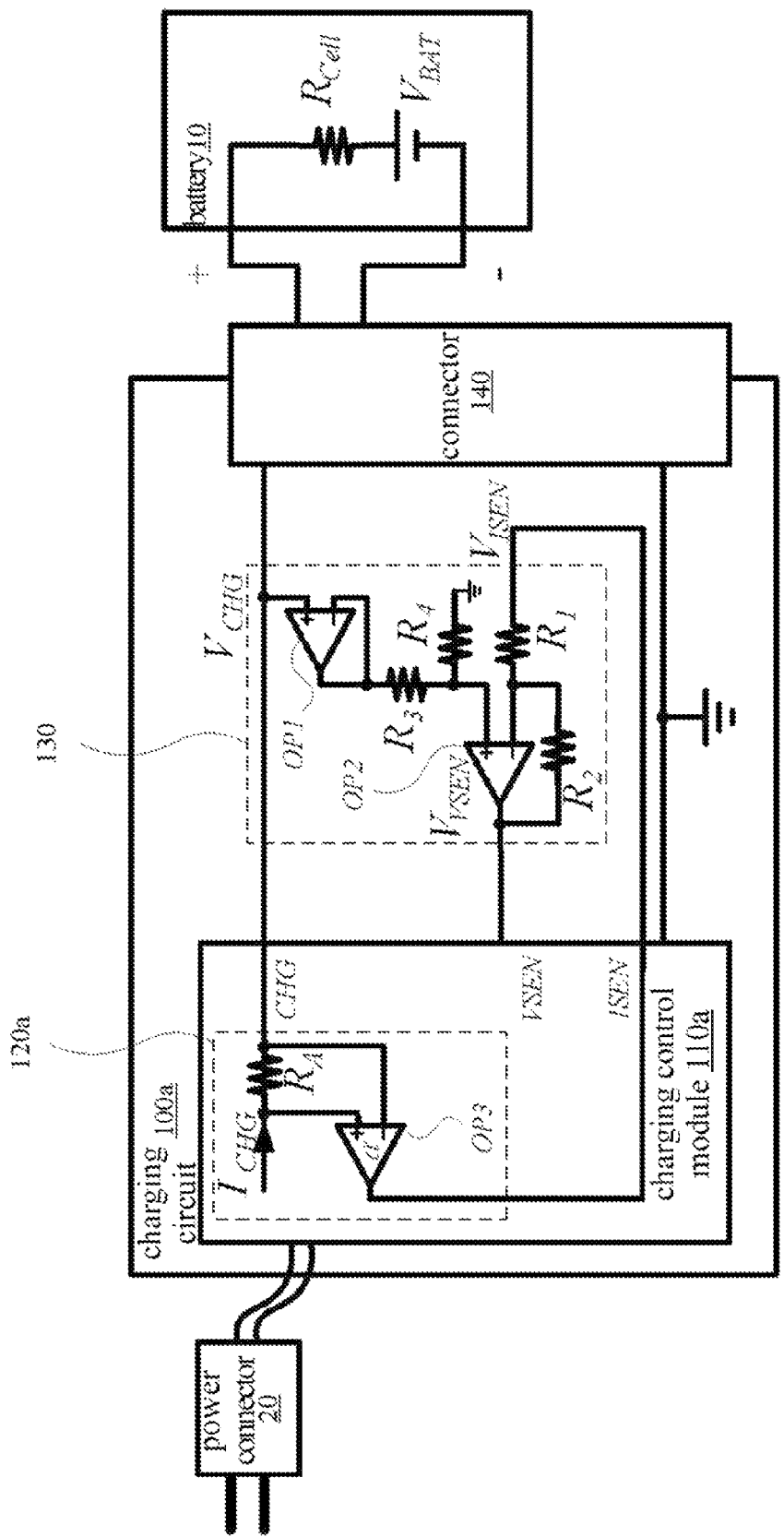
FIG. 5 is a schematic diagram showing a charging circuit in a second embodiment.

FIG. 5 is a schematic diagram showing a charging circuit 100a in a second embodiment. In the embodiment, the charging circuit 100a is similar with the charging circuit 100 in the previous embodiment, and the same parts are omitted herein.

In the embodiment, the current detecting module 120a can be integrated to the charging control module 110a, and the charging control module 110a can be achieved via a charging IC with a built-in charging current detecting function.

For example, in the embodiment, the current detecting module 120a can detect the charging current $I_{CHG}$ outputted by the charging control module 110a, and generate the detecting voltage $V_{ISEN}$ accordingly. Then, the current detecting module 120a outputs the detecting voltage $V_{ISEN}$ to the compensation module 130 via the output end $I_{SEN}$ of the charging control module 110a to make the compensation module 130 generate the feedback voltage $V_{VSEN}$ according to the detecting voltage $V_{ISEN}$. Other details can refer to the previous embodiments, which are omitted herein.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A charging circuit of a battery, comprising:
   a charging control module providing a charging voltage;
   a current detecting module detecting a charging current and generating a detecting voltage according to the charging current; and
   a compensation module detecting the charging voltage and providing a feedback voltage to the charging control module according to the detecting voltage and the charging voltage,
   wherein the compensation module further includes:
   a buffer receiving and buffering the charging voltage, and providing the buffered charging voltage to an operational amplifier;
   the operational amplifier receiving the detecting voltage and the buffered charging voltage, and subtracting the detecting voltage from the buffered charging voltage to obtain the feedback voltage;
   a first resistor electrically connected between a first input terminal of the operational amplifier and the current detecting module;
   a second resistor electrically connected between the first input terminal of the operational amplifier and an output terminal of the operational amplifier;
   a third resistor electrically connected between an output terminal of the buffer and a second input terminal of the operational amplifier; and
   a fourth resistor electrically connected between the second input terminal of the operational amplifier and a ground potential.

2. The charging circuit according to claim 1, wherein the charging control module selectively provides a constant charging current or a fluctuant charging current to the battery according to the feedback voltage.

3. The charging circuit according to claim 1 wherein when the feedback voltage is larger than or equal to a saturated charging level, the charging control module is switched from providing a constant charging current to providing a fluctuant charging current to the battery.

4. The charging circuit according to claim 1, wherein the current detecting module includes:
   a current detecting resistor, wherein the charging current flows through the current detecting resistor and generates a potential difference between two ends of the current detecting resistor; and
   a differential amplifier amplifying the potential difference at two ends of the current detecting resistor to provide the detecting voltage.

\* \* \* \* \*